March 7, 1961 E. B. STRATTON, JR 2,973,558
METHOD FOR DEEP-DRAW VACUUM FORMING
Filed Feb. 24, 1958
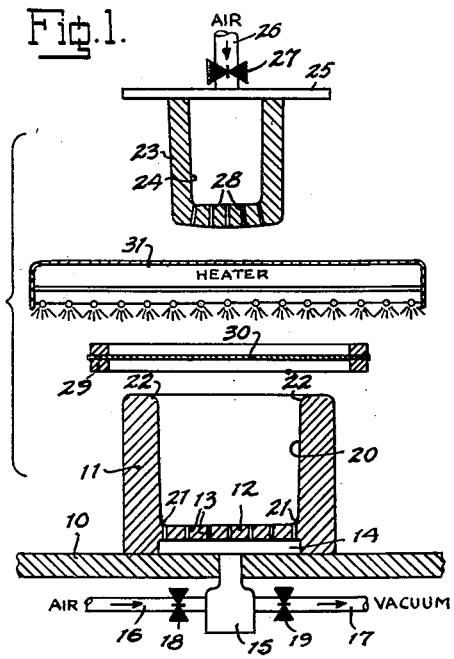
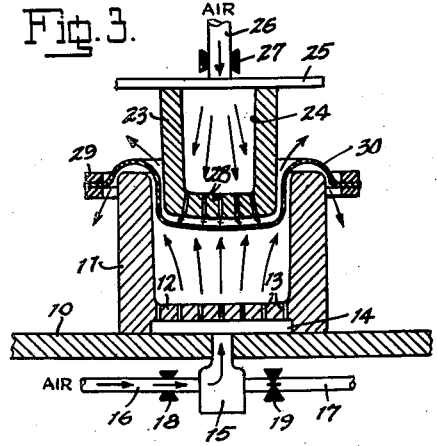
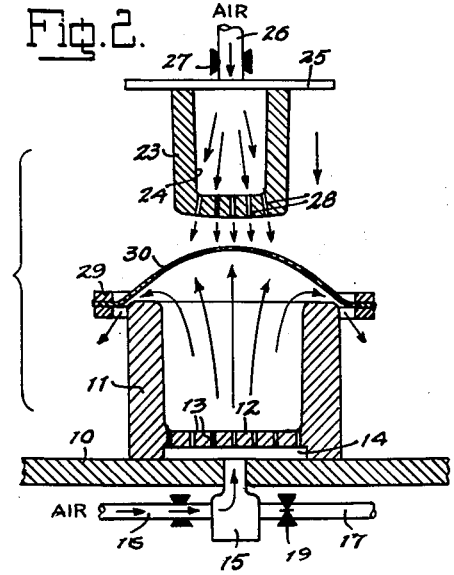
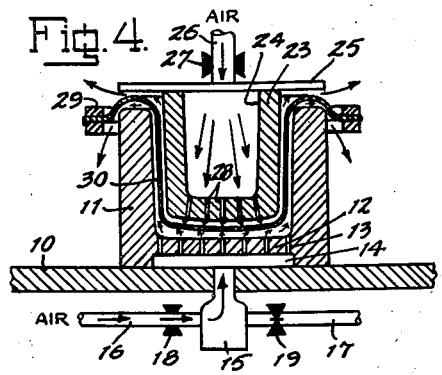
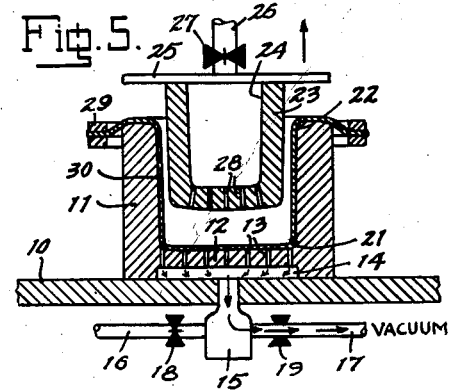
INVENTOR.
EDWARD BOWMAN STRATTON, JR.
BY
ATTORNEY.

United States Patent Office 2,973,558
Patented Mar. 7, 1961

2,973,558

METHOD FOR DEEP-DRAW VACUUM FORMING

Edward Bowman Stratton, Jr., Fairfield, Conn., assignor to National Cleveland Corporation, a corporation of Ohio Filed Feb. 24, 1958, Ser. No. 716,946

4 Claims. (Cl. 18—56)

The present invention relates to a method for deep-draw vacuum forming, and particularly the vacuum forming of high walled containers and similar articles from thermoplastic sheet material, such as polyethylene, high-impact styrene, vinyl, and other suitable thermoplastics. An object of the invention is to provide a method and apparatus whereby it is possible on a high production basis to deep-draw vacuum from thin or heavy gauge thermoplastic sheet materials with high uniformity of wall thickness and relatively low corner radii.

A further object is to provide a novel method by which a heat-softened sheet of thermoplastic material is caused to stretch uniformly while seeking an approximate configuration to the shape of a cavity mold, and to this end it is proposed in an extremely short time in a fast forming cycle to subject the heat-softened sheet to a pre-forming operation before actual vacuum forming to final shape in the cavity mold takes place. In carrying out the pre-forming procedure a heated assisting plug is provided for cooperation with the cavity mold, and a novel utilization of air pressures is employed to provide cushions of moving air on both sides of the heated thermoplastic sheet, and whereby the sheet is in effect suspended between two cushions of moving air as it is stretched and pre-formed, and is out of contact with the heated assisting plug and the cool cavity mold during the stretching and pre-forming operation. The cushions of moving air thus prevent chilling contact of the plastic sheet with the mold surfaces in the extremely short time when the sheet must pre-form to the approximate shape of the final molded piece, while stretching in a manner that will maintain a high uniformity of wall thickness.

Another object is to provide a novel method whereby the final vacuum forming is performed against a relatively cool cavity mold thus allowing for rapid chilling of the formed plastic material, faster forming cycles, and easy removal of the formed articles.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

Fig. 1 is a schematic view partially in vertical section and partially in side elevation showing the parts of the apparatus in their position at the beginning of the forming cycle with a heater positioned above the thermoplastic sheet.

Fig. 2 shows the initial pre-forming step wherein the clamping frame supporting the thermoplastic sheet is draped to an elevation slightly below the top of the cavity mold, air is introduced into the cavity mold to produce a pressure build-up causing the sheet to stretch into a bubble, and the heated assisting plug descends with air being ejected from its lower end towards the sheet.

Fig. 3 shows the partial pre-forming of the sheet as the plug enters the cavity mold.

Fig. 4 shows the complete pre-forming of the sheet at the end of the descending movement of the plug.

Fig. 5 shows the final vacuum forming step wherein the plastic material is vacuum formed into conformity with the cavity mold.

Referring to the drawings, the apparatus for carrying out the method of the invention is preferably incorporated in a suitable automatic machine having means for imparting relative movements to the associated parts in properly timed relation during each operating cycle, to operate valves for the supply of air and vacuum, and to control the desired temperatures of the heater and assisting plug. The apparatus illustrated schematically by way of example comprises a platen 10 supporting a cavity mold 11 provided with a base wall 12 having a plurality of suitably positiond air passages 13 extending between the interior of the mold and a recess 14 in the underside of the mold. A head 15 is mounted in the platen in communication with the recess 14, and is connected to an air supply duct 16 at one side and a vacuum or air exhaust duct 17 at the other side, the ducts 16 and 17 being respectively provided with valves 18 and 19. The cavity mold is designed for the particular article to be produced, and is shown in the illustrated example as provided with a cavity 20 of rectangular outline having a flat bottom and upright side walls having a slight upwardly divergent taper, of about 2° for example. The particular mold illustrated is designed for the production of a film development tank which may, for example, have a depth of about 12″ and a dimension at the top of about 8″ x 10″. The bottom corners 21 between the side walls and the base and the top corners 22 between the side walls and the top of the mold may have a radii of a relatively small order, for example ¼″ and ½″ respectively. Obviously the cavity mold may be designed for the production of deep-draw articles of any desired shape and dimensions within the capabilities of the method of the invention.

A hollow assisting plug 23 having an internal chamber 24 is secured in suspended relation upon a reciprocating platen 25, adapted to impart vertical movement to the plug, as will presently more fully appear, an air duct 26 being mounted in the platen in communication with the chamber 24 and provided with a valve 27. The external shape of the plug approximates the internal shape of the article to be formed, but is of smaller dimensions both vertically and laterally, so that when engaged within the cavity mold a space is provided between the interior of the mold and the plug substantially greater than the wall thickness of the article to be formed, for a purpose to presently more fully appear.

The plug is heated, as for instance by electric heating elements incorporated therein in well known manner, to a desired temperature, which may be thermostatically controlled, the temperature for example being of the order of 260° F. plus. In the base wall of the plug there are provided a plurality of air jet passages 28 through which warm air introduced into the chamber 24 from the air duct 26, under pressure, and heated by the heat of the plug, is adapted to be ejected downwardly, for a purpose to presently more fully appear.

Between the cavity mold and the plug there is provided a material clamping frame 29, preferably rectangular and of a size to extend substantially beyond the periphery of the cavity mold, this frame being mounted within the machine upon suitable means which lowers and raises it in the proper timed relation during each cycle of operation. The thermoplastic sheet material 30 to be formed is clamped at its marginal edges in the frame.

A radiant type electric heater 31 is adapted to be positioned above the frame 29 to heat the thermoplastic sheet prior to the forming operation, and preferably this heater is mounted in the machine for lateral movement so that it can be moved directly above the thermoplastic sheet as shown in Fig. 1 to bring the sheet to the desired softening temperature, for example 250° F. plus, and thereupon withdrawn to provide a free space between the thermoplastic sheet and the assisting plug 23.

As seen in Fig. 1, the thermoplastic sheet 30 held within the clamping frame and positioned in spaced relation above the cavity mold 11 is brought to molding temperature by the superimposed heater 31. The temperature may vary depending upon the particular character and gauge of the thermoplastic sheet material employed, but as an example a sheet of high impact polystyrene would have a temperature of 250° F. plus. When the sheet has attained the proper temperature and is thus rendered sufficiently soft for stretching and forming, the clamping frame 29 is moved downwardly to a draped position as shown in Fig. 2 slightly below the top of the cavity mold. Under conventional vacuum forming methods, this would normally effect the necessary "seal-off" through engagement of the thermoplastic sheet with the top of the mold, but according to the present method, air under pressure is introduced into the cavity mold by opening the valve 18 before contact of the sheet with the top of the mold can take place and at the point where there is a restricted passage between the thermoplastic sheet and the periphery of the mold. This results in a rapid build-up of air pressure within the mold beneath the soft thermoplastic sheet with a simultaneous controlled escape of air through the restricted passage, as indicated by the arrows in Fig. 2, causing the sheet to balloon into an upward bulge, and providing an important initial stretch in the material which takes place freely over the entire area within its clamped margin and without chilling or slip contact with the mold.

In point of time, in the method herein described by way of example, the downward movement of the frame and the ballooning of the heat softened sheet takes place in 0.5 second.

A split second later the heated assisting plug 23, with the valve 27 opened and air jetting downwardly therefrom, as indicated by the arrows, descends into the ballooned plastic bubble. The warm air under pressure jetting downwardly from the plug prevents freezing of the hot plastic sheet in the area immediately below the plug, creating in effect a cushion of moving air between the base of the plug and the thermoplastic sheet, which in cooperation with the pressure equalizing cushion of moving air beneath the material suspends the material in spaced relation below the plug. In the pre-stretching of the heated sheet as a result of the descent of the hot plug into the cavity mold, air within the mold is compressed, and the escaping air causes a "blow-molding" stretching factor to take place around the top of the cavity mold. As seen in Fig. 3, the escaping air, between the material and the top of the cavity mold and between the material and the sides of the plug, maintains the material in such suspended relation out of contact with both the mold and the plug as the plug moves to its maximum descent as shown in Fig. 4. Stretch is thus imparted to the material, and due to its freedom from engagement with the mold and plug surfaces a substantially uniform thickness of the formed material results. As seen in Fig. 4 the stretched and pre-formed material closely approximates the general configuration of the final mold shape, but has not yet been molded since it is supported between the hot plug and the cool cavity mold by cushions of moving air. Continuous introduction of air, while at the same time allowing air to escape automatically, adjusts air cushion pressures to prevent pocket build-ups, etc. In point of time, in the exemplary method herein described, the position of Fig. 3 is reached at 1.0 second from the start and the position of Fig. 4 is reached at 1.5 seconds from the start.

As soon as the plug has reached its maximum descent air pressure is stopped through closing of the valves 18 and 27 and simultaneously a vacuum is drawn into the cavity mold by opening the valve 19. The hot plastic material immediately snaps to the shape of the cavity mold, losing its heat rapidly since the mold is relatively cool, the mold temperature being of the order of about 120–150° F. Also simultaneously with the stopping of the air pressure and the starting of the vacuum the plug starts its ascent as shown in Fig. 5 and moves to the starting position of Fig. 1. In point of time the final vacuum forming of the article is completed in 2.5 seconds from the start of the operating cycle.

Rapid removal of the formed part is preferably accomplished, following closing of the vacuum valve 19, by opening the air valve 18 to introduce "blow-off" air pressure into the cavity mold beneath the formed article and at the same time lifting the clamping frame to a point where the article can then be conveniently removed from the machine upon opening the clamping frame. This air "blow-off" following the vacuum forming operation also helps to remove any residual heat from the cavity mold, which insures maintenance of a fast operating cycle and consequent high rate of production with no lost time waiting for the mold to cool.

The plug speed may vary with different gauges of sheet material, being relatively slower with heavy gauges than with thin gauges of the same type of material. Also the relative temperatures of the plug and sheet may vary with different types as well as with different gauges of material. In every case, however, it has been found, for best results using presently known commercial materials, the plug temperature should be in excess of the sheet temperature.

An outstanding advantage of the present method is the high degree of physical and geometrical control that can be maintained over the heretofore virtually uncontrollable hot plastic material, an important factor being that this control is exerted in the critical and short space of time when the plastic material must be stretched to its final shape while maintaining a desirable degree of wall thickness uniformity. Another advantage—especially over other hot plug methods where the final forming is done against the plug—is that the forming is done against a cool cavity mold. This allows rapid chilling of the formed plastic material, faster forming cycles, and easy removal of the formed articles.

What is claimed is:

1. The method of forming a sheet of thermoplastic material, comprising the steps of heating said sheet to a temperature rendering it moldable, disposing said heated moldable sheet between a heated plug at one side having a temperature at least substantially approximating the temperature of said heated moldable sheet and a cavity mold at the other side having a temperature substantially less than the temperature of said heated moldable sheet, pre-forming said heated moldable sheet through relative movement between said plug and cavity mold to bring said plug into said cavity mold with said heated moldable sheet interposed, introducing simultaneously with said relative movement air under pressure to create a spacing cushion of moving air between said heated moldable sheet and the opposed surface of said plug, and also simultaneously with said relative movement introducing air under pressure to said cavity mold to create a spacing cushion of moving air between said heated moldable sheet and the opposed surface of said cavity mold, whereby said heated moldable sheet is supported out of contact with said opposed surfaces of said heated plug and said cavity mold throughout said preforming step, and evacuating the air between said pre-formed sheet and said cavity mold to cause said pre-formed sheet to be drawn away from said heated plug and molded against the opposed surfaces of said cavity mold.

2. The method of forming a sheet of thermoplastic material, comprising the steps of heating said sheet to a temperature rendering it moldable, disposing said heated moldable sheet between a heated plug at one side having a temperature at least substantially approximating the temperature of said heated moldable sheet and a cavity mold at the other side having a temperature substantially less than the temperature of said heated moldable sheet, pre-forming said heated moldable sheet through relative movement between said plug and cavity mold to bring said plug into said cavity mold with said heated moldable sheet interposed, introducing simultaneously with said relative movement jets of heated air under pressure through the leading end of said heated plug against said heated moldable sheet to create a spacing cushion of moving air between said heated moldable sheet and the opposed surface of said plug, and also simultaneously with said relative movement introducing air under pressure to said cavity mold to create a spacing cushion of moving air between said heated moldable sheet and the opposed surface of said cavity mold, whereby said heated moldable sheet is supported out of contact with said opposed surfaces of said heated plug and said cavity mold throughout said pre-forming step, and evacuating the air between said pre-formed sheet and said cavity mold to cause said pre-formed sheet to be drawn away from said heated plug and molded against the opposed surfaces of said cavity mold.

3. The method of forming a sheet of thermoplastic material, comprising the steps of heating said sheet to a temperature rendering it moldable, disposing said heated moldable sheet between a heated plug at one side having a temperature at least substantially approximating the temperature of said heated moldable sheet and a cavity mold at the other side having a temperature substantially less than the temperature of said heated sheet, pre-forming said heated moldable sheet through relative movement between said plug and cavity mold to bring said plug into said cavity mold with said heated sheet interposed, the external surfaces of said plug and the internal surface of said cavity mold being such that in the position of said plug within said mold cavity their side walls are in substantially parallel uniformly spaced relation to each other to receive said heated moldable sheet in parallel spaced relation between them, introducing simultaneously with said relative movement air under pressure to create a cushion of moving air between said heated moldable sheet and the opposed surface of said plug, and also simultaneously with said relative movement introducing air under pressure to said cavity mold to create a spacing cushion of moving air between said heated moldable sheet and the opposed surfaces of said cavity mold, whereby said heated moldable sheet is supported out of contact with said opposed surfaces of said heated plug and said cavity mold throughout said pre-forming step, and evacuating the air between said pre-formed sheet and said cavity mold to cause said pre-formed sheet to be drawn away from said heated plug and molded against the opposed surfaces of said cavity mold.

4. The method of forming a sheet of thermoplastic material, comprising the steps of securing said sheet at its margins in a clamping frame, heating said sheet to a temperature rendering it moldable, disposing said heated moldable sheet between a heated plug at one side having a temperature at least substantially approximating the temperature of said heated moldable sheet and a cavity mold at the other side having a temperature substantially less than the temperature of said heated moldable sheet, moving said heated moldable sheet into contiguous opposed relation to the open end of said cavity mold and out of contact with the end surface thereof surrounding its cavity to provide a restricted passage between said heated moldable sheet and said end surface, introducing simultaneously with said movement of said heated moldable sheet air under pressure to said cavity mold to cause said heated moldable sheet to stretch and bulge outwardly toward said heated plug while maintaining a spacing cushion of moving air between said heated moldable sheet and said end surface through the escape of air through said restricted passage, pre-forming said heated moldable stretched sheet through relative movement between said plug and cavity mold to bring said plug into said cavity mold with said heated moldable stretched sheet interposed, introducing simultaneously with said relative movement air under pressure to create a spacing cushion of moving air between said heated moldable stretched sheet and the opposed surface of said plug, and also simultaneously with said relative movement continuing introduction of air under pressure to said cavity mold to create a spacing cushion of moving air between said heated moldable stretched sheet and the opposed surface of said cavity mold, whereby said heated moldable stretched sheet is supported out of contact with said opposed surfaces of said heated plug and said cavity mold throughout said pre-forming step, and evacuating the air between said pre-formed sheet and said cavity mold to cause said pre-formed sheet to be drawn away from said heated plug and molded against the opposed surfaces of said cavity mold.

References Cited in the file of this patent

UNITED STATES PATENTS

| | | |
|---|---|---|
| 2,282,423 | Kopitke | May 12, 1942 |
| 2,387,886 | Devol | Oct. 30, 1945 |
| 2,468,697 | Wiley | Apr. 26, 1949 |
| 2,531,540 | Smith | Nov. 28, 1950 |
| 2,695,255 | Avery | Nov. 23, 1954 |
| 2,832,094 | Groth | Apr. 29, 1958 |

OTHER REFERENCES

"Modified Vacuum Forming Technique," published in British Plastics, vol. 29, No. 7 (July 1956), pages 252, 253.

"Air Slip Forming," published in Rubber & Plastics Age (July 1956), pages 460, 461.